United States Patent Office 3,335,930
Patented Aug. 15, 1967

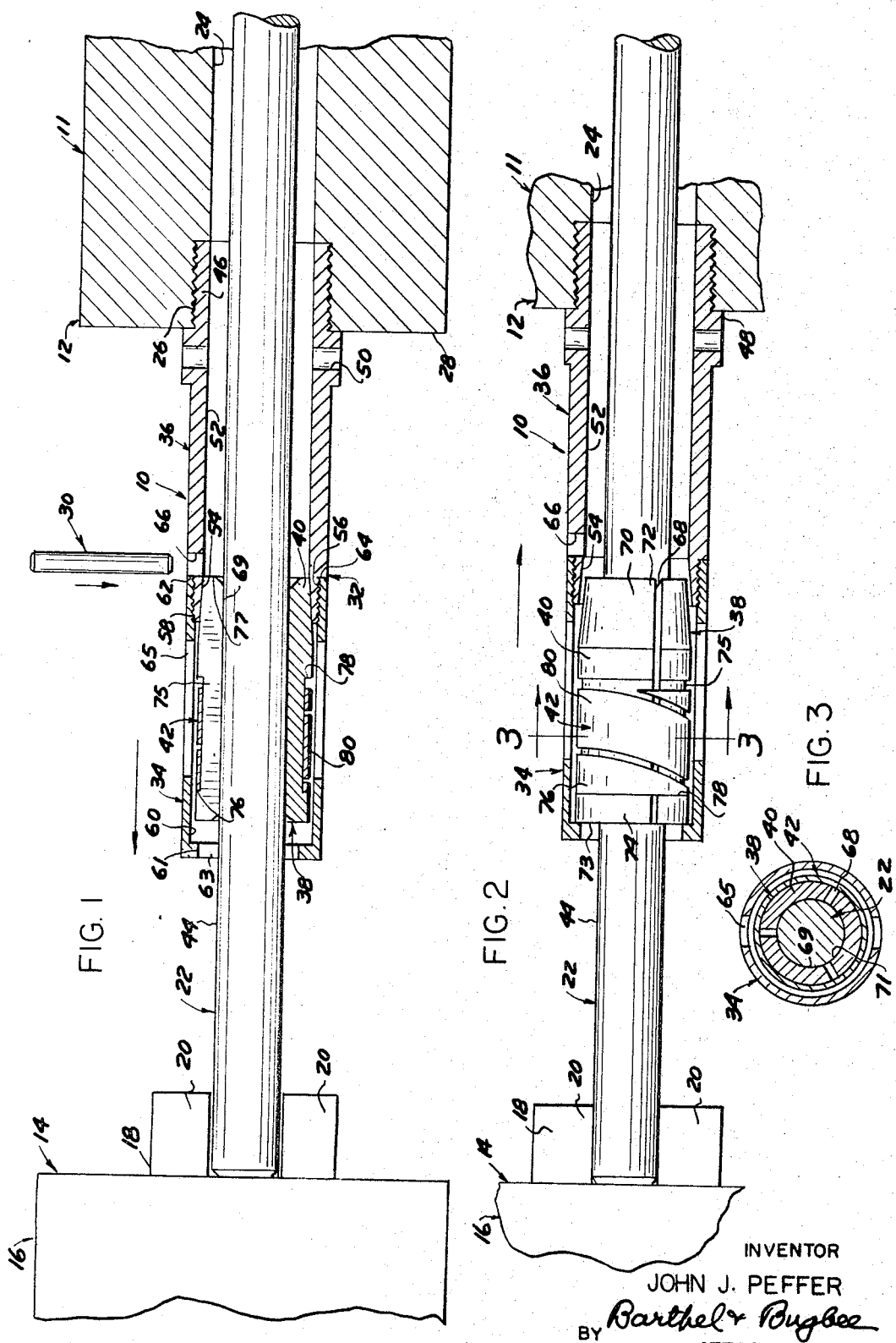

3,335,930
ROD STOCK FEEDER FOR AUTOMATIC SCREW MACHINES
John J. Peffer, Trenton, Mich., assignor to Web Collet and Machine Company, Ecorse, Mich.
Filed May 11, 1965, Ser. No. 454,867
5 Claims. (Cl. 226—166)

This invention relates to so-called automatic screw machines and, in particular, to stock feeders for such machines.

Hitherto, so-called automatic screw machines have been provided for producing a variety of workpieces by automatic machining operations. Although originally such machines were devised to turn out screws and other threaded parts, they are today primarily used to turn out unthreaded parts automatically, but the original designation of "automatic screw machine" has remained. Up to the present time, stock feeders have been provided for automatic screw machines wherein rod stock has been fed into the chuck of the machine and then disengaged from and withdrawn from the stock as the main chuck grips the workpiece, ready for subsequent machining and cut-off operations. Such prior stock feeders, however, have been subject to slippage, resulting in the production of workpieces of improper length or wrong locations of cut and consequently producing many rejected workpieces and a large amount of scrap. Such prior stock feeders have also required long strokes for their operation and consequent excessive times of operation, thereby causing a reduction in the amount of work produced per day on the machine. Other prior machines have also required positive stops for their operation, such positive stops causing occasional breakage of or damage to the machine or resulting in occasional overfeed. Another machine requires the use of a snap ring, the removal of which from its groove or its breakage has in the past caused injury to the operator. The present invention provides a stock feeder which eliminates these defects and disadvantages of prior stock feeders.

Accordingly, one object of this invention is to provide an automatic screw machine stock feeder which operates with a very short stroke to feed rod stock into the main collet chuck of the automatic screw machine as the main chuck opens, and then releases its grip on the stock and backs off after the main collet chuck closes, returning to its original position ready for another feeding stroke when the subsequent machining operations have been completed and the thus-machined workpiece ejected from the machine.

Another object is to provide an automatic screw machine stock feeder of the foregoing character wherein the feeder "pad" or stock gripping device is provided with an elongated helical constriction spring which constricts the feeder stock gripping jaws so as to give them a constant gripping force upon the stock, this gripping force being sufficient to prevent slippage of the stock under normal conditions yet permitting slippage when the stock has been gripped by the main collet chuck of the machine and the feeder has released its feeding grip and is moving backward upon its retraction or return stroke.

Another object is to provide an automatic screw machine stock feeder as set forth in the object immediately preceding, wherein the constriction spring also automatically takes up wear upon the feeder gripping jaws so as to render them self-adjusting to wear on their stock-gripping surfaces.

Another object is to provide an automatic screw machine stock feeder of the foregoing character mounted in a stock feeder housing having openings therein for the ejection of scale, turnings or other undesired loose particles which might otherwise interfere with the proper feeding of the stock.

Another object is to provide an automatic screw machine stock feeder of the foregoing character having co-operating tapered male and female members for impressing and releasing the stock feeding chuck jaws, an insertable and removable pin being provided for inactivating the stock-gripping feeder chuck when a work run has been completed and it is desired to withdraw the surplus rod stock from the feeder.

Another object is to provide an automatic screw machine stock feeder of the foregoing character wherein a range of stock feeding chuck jaws of various sizes to feed various diameters of stock are interchangeable within a single size of feeder housing.

Other objects and advantages of the invention will become apparent during the course of the following description of the accompanying drawings, where:

FIGURE 1 is a central vertical longitudinal section through an automatic screw machine stock feeder according to one form of the invention, with the stock and feeder in their positions at the end of their forward stroke, ready for the main screw machine collet chuck jaws to close upon the stock, with a feeder chuck de-activating pin shown above the feeder, ready for insertion therein at the close of the work run;

FIGURE 2 is a view similar to FIGURE 1, but with the stock feeder gripping chuck shown in side elevation, with the screw machine collet chuck closed upon the forward end of the stock, and with the feeder stock grip released and the feeder moving backward upon its return stroke; and FIGURE 3 is a cross-section through the stock feeder and stock fed thereby, taken along the line 3—3 in FIGURE 2.

Referring to the drawings in detail, FIGURES 1 and 2 show a stock feeder, generally designated 10, adapted to be mounted in the head 11 of a reciprocating stock feeding carriage 12 of an automatic screw machine 14 having a rotary work holding head 16 equipped with a main collet chuck 18 having jaws 20 which hold the forward end of rod stock 22 being worked upon in the automatic screw machine 14. The automatic screw machine 14 is shown diagrammatically as representing any one of a number of different types of such machines to which the present invention is adaptable, and the details of the machine 14 are beyond the scope of the present invention. For the purposes of the present disclosure, it is believed sufficient to state that the jaws 18 of the main chuck 20 are opened and closed automatically, as by cams (not shown) in timed relationship with the motion of the carriage 12 which in itself is moved back and forth upon its forward and retraction strokes respectively by cams or other similar mechanisms. Not shown are the cutting, threading, cut-off and other machining tools which operate upon the workpiece or rod stock 22 in timed relationship with the motions of the main chuck 18 and feed carriage 12.

The stock feeding carriage head 11 is provided with a bore 24 through which the rod stock 22 extends and is fed, and is also provided at its forward end with a threaded counterbore 26 in which the stock feeder 10 is mounted, in abutment with the forward face 28 of the carriage 12. A feeder chuck de-activation pin, generally designated 30, is used, as its name suggests, to render the gripping function of the stock feeder 10 inoperative at the end of a work run when a sufficient number of workpieces has been produced by the automatic screw machine 14 and it is necessary to remove the remaining length of rod stock 22 from the machine, as explained below in connection with the operation of the stock feeder 10.

The stock feeder 10 consists generally of a two-part tubular housing 32 having forward and rearward components or halves 34 and 36 respectively, a rod stock feeder chuck assembly 38 including a plurality of feeder chuck jaws 40 and a helical constriction spring 42 which constantly exerts a constricting effect upon the jaws 40 of the feeder chuck jaw assembly 38 to provide a constant yet yieldable gripping action upon the external cylindrical surface 44 of the rod stock 22. The rearward half or component 36 of the tubular housing 32 is provided at its rearward end with a reduced diameter externally-threaded portion 46 which is threaded into the threaded counterbore 26 in the stock feeding carriage head 11 and has at that location an annular enlargement or flange 48 which abuts the front surface 28 of the head 11 and which is provided with radial spanner holes 50 for the reception of a handle rod or spanner lugs for threading the stock feeder 10 into and out of the counterbore 26. The rearward housing half 36 is provided with a through bore 52 which at its forward end terminates in a flared or conical tapered portion 54. Surrounding the flared portion 54 is an externally-threaded reduced-diameter forward end portion 56 which receives the correspondingly-internally-threaded rearward end portion 58 of a bore 60 within the forward housing half 34. The threaded portions 56 and 58 have left-hand threads to prevent unscrewing thereof during normal operation.

The forward housing half or component 34 is provided at its forward end with an internal annular stop flange 61 surrounding a central opening 63 and has a rearward end surface 62 which abuttingly engages the annular forward shoulder 64 of the rearward housing half 36. The latter contains a radial hole 66 immediately adjacent the shoulder 64 for reception of the feeder chuck de-activation pin 30. The forward housing half 34 contains elongated slots 65 for the escape of scale, metal turnings and other foreign matter.

The feeder chuck jaw assembly 38 conveniently includes three of the chuck jaws 40, each of arcuate cross-section (FIGURE 3) and spaced apart from one another circumferentially by longitudinal gaps 68 and with the gaps 68 extending around the entire circumferential surface 44 of the rod stock 22 being fed. Each chuck jaw 40 has an inner cylindrical surface 69 corresponding to the rod stock surfaces 44, and is provided at its rearward end with a partially externally-conical tapered portion 70 which with the other two chuck jaws 40 forms an interrupted externally conical or tapered surface 72 fitting and coacting with the internal tapered or conical surface 54 to close up the gaps 68 and tighten the grip of the inner cylindrical chuck jaw surfaces 69 upon the outer cylindrical surface 44 of the rod stock 22. The inner chuck jaw surfaces 69 in assembly collectively form an interrupted cylindrical bore or internal surface 71.

At its flared forward end 73, each jaw 40 is provided with an arcuate flange 74 which is separated from the conical rearward portion 70 by the bottom surface 75 of an arcuate groove or recess 76 which with the corresponding grooves 76 of the other jaws 40 forms an interrupted elongated shallow annular groove or recess 78. The flared rearward end 77 of each jaw 40 is disposed adjacent the hole 66 so as to be engaged by the inner end of the pin 30 when inserted therein preparatory to withdrawal of the remaining rod stock 22 at the end of a work run, as explained below.

Mounted in and encircling the groove 78 are the convolutions 80 of the flat helical constriction spring 42, which is a flat spring in that the convolutions are flat rather than rounded as in usual helical compression springs. The constriction spring 42, as its name suggests, in its relaxed condition has an internal diameter somewhat less than the external diameter of the bottom surface 75 of the shallow groove 76.

Prior to the operation of the automatic screw machine 14, let it be assumed that the externally-threaded rearward end portion 46 of the rod stock feeder 10 has been threaded into the threaded counterbore 26 in the head 11 and that a length 22 of rod stock has been pushed through the central bore 71 of the stock feeder chuck jaws 40, pushing the latter outward against the opposition of the constriction spring 42. The chuck jaws 40 then exert a yielding frictional grip upon the external cylindrical surface 44 of the rod stock 22.

In operation, as the carriage 12 of the automatic screw machine 14 carries the head 11 forward and with it the rod stock feeder 10, the forward end of the rod stock 22 is moved into the space between the now open jaws 20 of the main collet chuck 18 in the main rotary head 16 of the machine 14. Pursuant to the operation of the machine 14 and its cams or other timed mechanism, the jaws 20 then close upon the end portion of the rod stock 22 with a tight frictional grip, whereupon the mechanism of the automatic screw machine 14 retracts the stock feeding carriage 12 and with it the head 11 in the direction of the arrow shown in FIGURE 2. As this occurs, the internally-tapered portion 54 of the housing 32 is moved away from the externally-tapered portion 72 of the chuck jaw assembly 38, whereupon the constriction spring 42 continues to squeeze the stock feeder chuck jaws 40 into yielding frictional engagement with the rod stock 22, sliding rearwardly over the external cylindrical surface 44 thereof until the carriage 12 reaches the rearward end of its stroke. Meanwhile, the cutting mechanism (not shown) of the automatic screw machine 14 automatically performs the cutting and cut-off operations upon the rod stock 22 and the ejection mechanism ejects the thus-machined workpiece.

The carriage 12 and head 11 now start forward in the direction of the arrow in FIGURE 1 upon another feeding stroke, thereby moving the internally-tapered portion 54 of the housing bore 52 into engagement with the externally-tapered jaw portion 70 collectively forming the interrupted externally-conical surface 72 of the jaw assembly 38. This action forces the jaws 40 of the jaw assembly 38 radially onward into tight frictional engagement with the external cylindrical surface 44 of the rod stock 22, moving the latter forward until its forward end again enters the space between the again-opened jaws 20 of the main collet chuck 18 of the rotary main head 16, and the foregoing operations are again repeated.

At the end of a work run, if, as is usual, there is a usable length of rod stock 22 left in the machine after the last workpiece of the order has been machined, the operator inserts the chuck deactivation pin 30 through the hole 66 (FIGURE 1) in the direction of the radial arrow so that it comes to rest on the external surface 44 of the rod stock 22 adjacent the flared rearward end 77 of one of the stock feeder chuck jaws 40. The operator then grasps an exposed portion of the rod stock 22, such as the rearward end thereof and with a sharp jerk or steady force pulls it rearwardly to the left out of the rod stock feeder 10 and rearwardly through the bore 24 of the stock feeder head 11. The force must of course be sufficient to overcome the frictional grip of the stock feeder chuck jaws 40 upon the rod stock 22 effected by the constriction spring 42. During this operation, the chuck jaws 40 are prevented from being moved rearwardly by the presence of the pin 30, which prevents the opposing tapered surfaces 54 and 70 from engaging sufficiently to lock the stock feeder chuck jaws 40 upon the rod stock length 22 as it is withdrawn from the machine.

What I claim is:
1. A rod stock feeder for attachment to an automatic screw machine, said rod stock feeder comprising
    an elongated tubular housing including a plurality of housing components joined to one another having a bore therethrough including an internally-tapered portion formed by the forming of said components,
    a rod stock feeder chuck assembly disposed within said bore and including a plurality of chuck jaws of arcu- ate cross-section spaced circumferentially around a central rod stock passageway therethrough corresponding in diameter to the diameter of the rod stock to be fed, said rod stock feeder chuck assembly having thereon an externally-tapered portion movable into and out of engagement with said internally-tapered portion of said housing bore, and a helical constriction spring encircling said rod stock feeder chuck assembly and extending spirally therealong in constricting engagement with the chuck jaws thereof.

2. A rod stock feeder, according to claim 1, wherein said housing which has a plurality of housing components has forward and rearward tubular members separably joined end-to-end to one another intermediate the opposite ends of said housing.

3. A rod stock feeder, according to claim 2, wherein said forward and rearward tubular members are threadedly coupled to one another rearwardly of said jaws.

4. A rod stock feeder, according to claim 1, wherein said constriction spring is a flat helical constriction spring.

5. A rod stock feeder, according to claim 1, wherein said housing contains a plurality of elongated openings therein disposed in circumferentially-spaced relationship adjacent said chuck jaw assembly and extending longitudinally therealong.

References Cited

UNITED STATES PATENTS

| | | | |
|---|---|---|---|
| 2,323,067 | 6/1943 | Martin | 279—57 |
| 2,363,889 | 11/1944 | Martin | 279—50 |
| 2,817,534 | 12/1957 | Cox | 226—166 X |

M. HENSON WOOD, JR., *Primary Examiner.*

J. N. ERLICH, *Assistant Examiner.*